United States Patent
Chang et al.

(10) Patent No.: US 8,941,945 B1
(45) Date of Patent: Jan. 27, 2015

(54) DATA STORAGE DEVICE SERVOING HEADS BASED ON VIRTUAL SERVO TRACKS

(71) Applicant: Western Digital Technologies, Inc., Irvine, CA (US)

(72) Inventors: Michael Chang, San Jose, CA (US); Wei Guo, Fremont, CA (US); Yun Hong, San Jose, CA (US); Brian P. Rigney, Louisville, CO (US); Guoxiao Guo, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/298,734

(22) Filed: Jun. 6, 2014

(51) Int. Cl.
*G11B 21/02* (2006.01)

(52) U.S. Cl.
USPC .......................................................... 360/75

(58) Field of Classification Search
USPC ................. 360/75, 31, 53, 48, 77.02, 78.04
See application file for complete search history.

(56) References Cited

U.S. PATENT DOCUMENTS

| | | | |
|---|---|---|---|
| 5,867,337 A | 2/1999 | Shimomura |
| 6,014,283 A | 1/2000 | Codilian et al. |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,091,559 A | 7/2000 | Emo et al. |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,493,176 B1 | 12/2002 | Deng et al. |
| 6,496,324 B1 | 12/2002 | Golowka et al. |
| 6,498,698 B1 | 12/2002 | Golowka et al. |

(Continued)

*Primary Examiner* — Nabil Hindi (57) ABSTRACT

A data storage device is disclosed comprising a first disk surface comprising servo tracks defined by servo sectors and recorded at a first radial density, and a first head actuated over the first disk surface. A servo sector on the first disk surface is read to generate a first physical position measurement that is converted into a first virtual position measurement corresponding to a nominal radial density of servo tracks different from the first radial density. The first head is servoed over the first disk surface based on the first virtual position measurement.

26 Claims, 4 Drawing Sheets

(56) References Cited

U.S. PATENT DOCUMENTS

| | | |
|---|---|---|
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,751,036 B2 | 6/2004 | Quak et al. |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,943,972 B1 | 9/2005 | Chue et al. |
| 6,952,322 B1 | 10/2005 | Codilian et al. |
| 6,954,324 B1 | 10/2005 | Tu et al. |
| 6,956,710 B2 | 10/2005 | Yun et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett et al. |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,362,529 B2 * | 4/2008 | Chiao et al. .................... 360/48 |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |

(56) References Cited

U.S. PATENT DOCUMENTS

| | | |
|---|---|---|
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 7,982,993 B1 | 7/2011 | Tsai et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,599,510 B1 | 12/2013 | Fallone |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

\* cited by examiner

DATA STORAGE DEVICE SERVOING HEADS BASED ON VIRTUAL SERVO TRACKS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
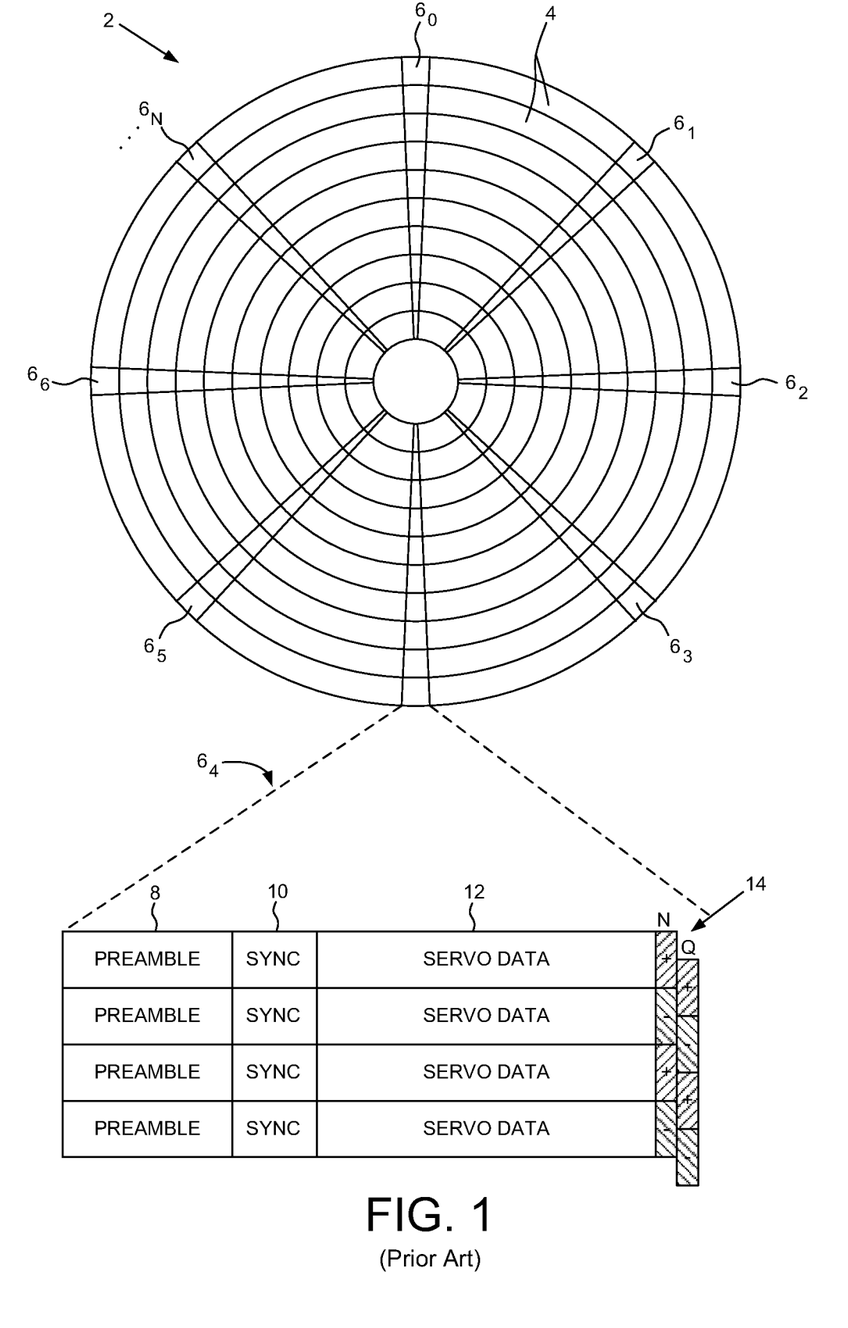
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo data 12 and servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figures 2A, 2B, 2C, 2D:
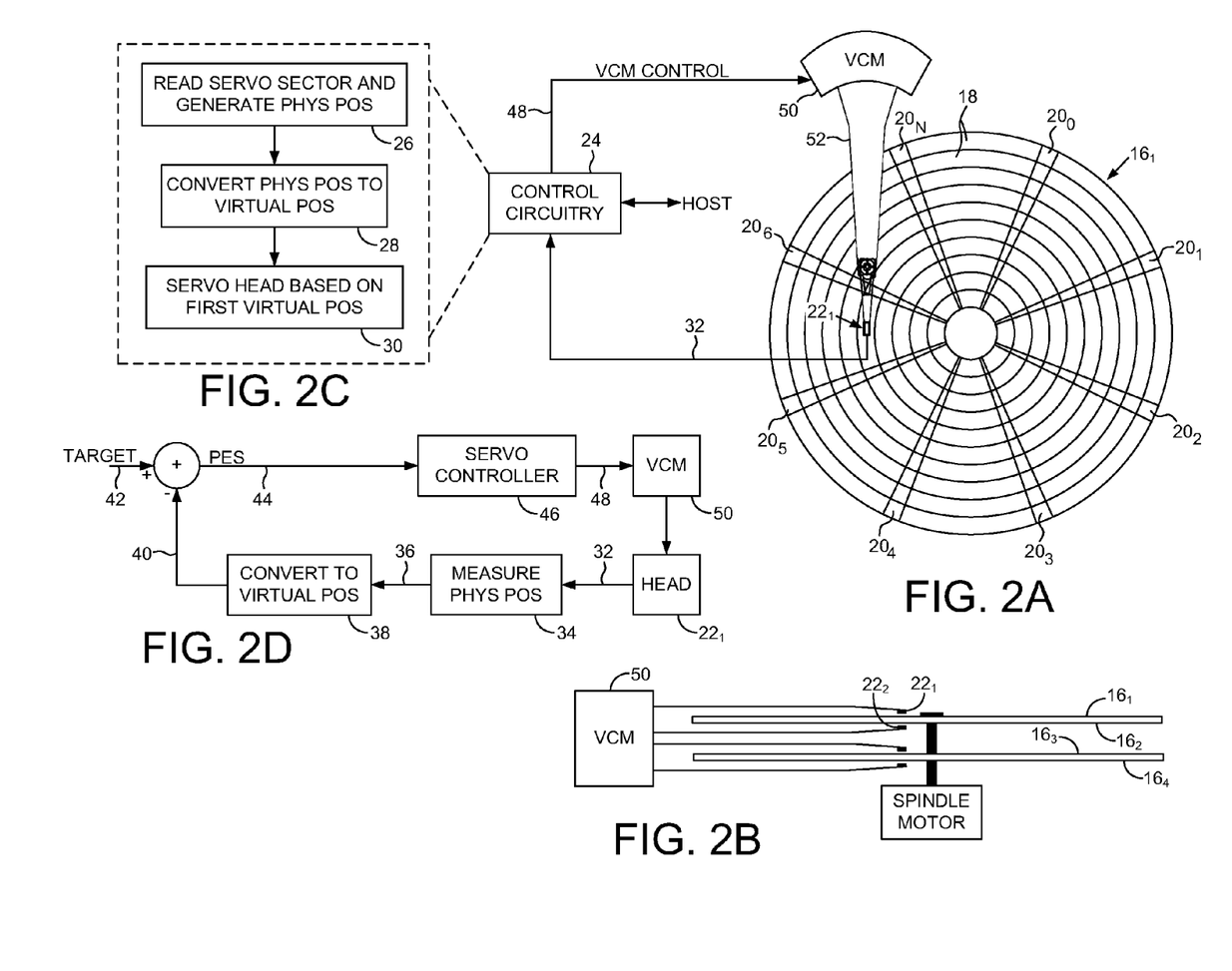
FIG. 2A shows a data storage device in the form of a disk drive according to an embodiment comprising a head actuated over a disk surface.
FIG. 2B shows a data storage device in the form of a disk drive according to an embodiment comprising a head actuated over a plurality of disk surfaces.
FIG. 2C is a flow diagram according to an embodiment wherein a servo sector on a first disk surface is read to generate a physical position measurement which is converted into a virtual position measurement used to servo the head.
FIG. 2D shows a servo control system according to an embodiment comprising a conversion operation for converting a physical position measurement into a virtual position measurement.

FIGS. 2A and 2B show a data storage device in the form of a disk drive according to an embodiment comprising a first disk surface $16_1$ comprising servo tracks 18 defined by servo sectors $20_0$-$20_N$ and recorded at a first radial density, and a first head $22_1$ actuated over the first disk surface $16_1$. The disk drive further comprises control circuitry 24, which in an embodiment is configured to execute the flow diagram of FIG. 2C, wherein a servo sector on the first disk surface is read to generate a first physical position measurement (block 26) that is converted into a first virtual position measurement (block 28) corresponding to a nominal radial density of servo tracks different from the first radial density. The first head is servoed over the first disk surface based on the first virtual position measurement (block 30).

FIG. 2D shows a servo control system according to an embodiment wherein a read signal 32 emanating from the first head $22_1$ when reading a servo sector is demodulated into a physical position measurement 36 at block 34. The physical position measurement may be represented as a track address and/or by a fraction of a servo track generated based on reading servo bursts in the servo sector. The physical position measurement 36 is converted at block 38 into a virtual position measurement 40 which is subtracted from a target position 42 to generate a position error signal (PES) 44. A servo controller 46 processes the PES 44 using any suitable servo compensator to generate a control signal 48 applied to a voice coil motor (VCM) 50. The VCM 50 rotates an actuator arm 52 about a pivot in order to move the head $22_1$ radially over the disk surface $16_1$ in a direction that reduces the PES.

In one embodiment, converting the physical position measurement generated by reading a servo sector into a virtual position measurement representing a nominal radial density of servo tracks reduces the complexity of the servo control system while enabling the disk surface to be servo written to achieve any desirable radial density of servo tracks. For example, certain aspects of the head (e.g., the geometry of the write and/or read element, and/or the sensitivity of read element) may dictate an optimal radial density of servo tracks for a particular head/disk surface combination. Rather than design the servo control system to compensate for a different radial density of servo tracks across different disk surfaces, in one embodiment the servo control system is designed to operate based on virtual servo tracks that are represented by a nominal radial density.

In one embodiment, a nominal radial density of the virtual servo tracks may be defined for a family of disk drives such that the servo control system may operate the same across the family of disk drives. For example, in one embodiment each disk drive may comprise a single disk surface having servo tracks defined by servo sectors and recorded at a particular radial density. However, the servo control system of each disk drive may operate the same across the disk drives after each disk drive converts the physical position measurement into a virtual position measurement. In another embodiment as shown in FIG. 2B, each disk drive may comprise a plurality of disk surfaces (e.g., four disk surfaces $16_1$-$16_4$) with a head actuated over each disk surface. The servo tracks of each disk surface may be recorded at a different radial density such that when the head is at a particular radial location common to each disk surface, the resulting physical position measurement may be different across the disk surfaces due to the different radial density of servo tracks. However, after converting the physical position measurement into a virtual position measurement for each disk surface, the servo control system may operate the same across the disk surfaces.

Figure 3A:
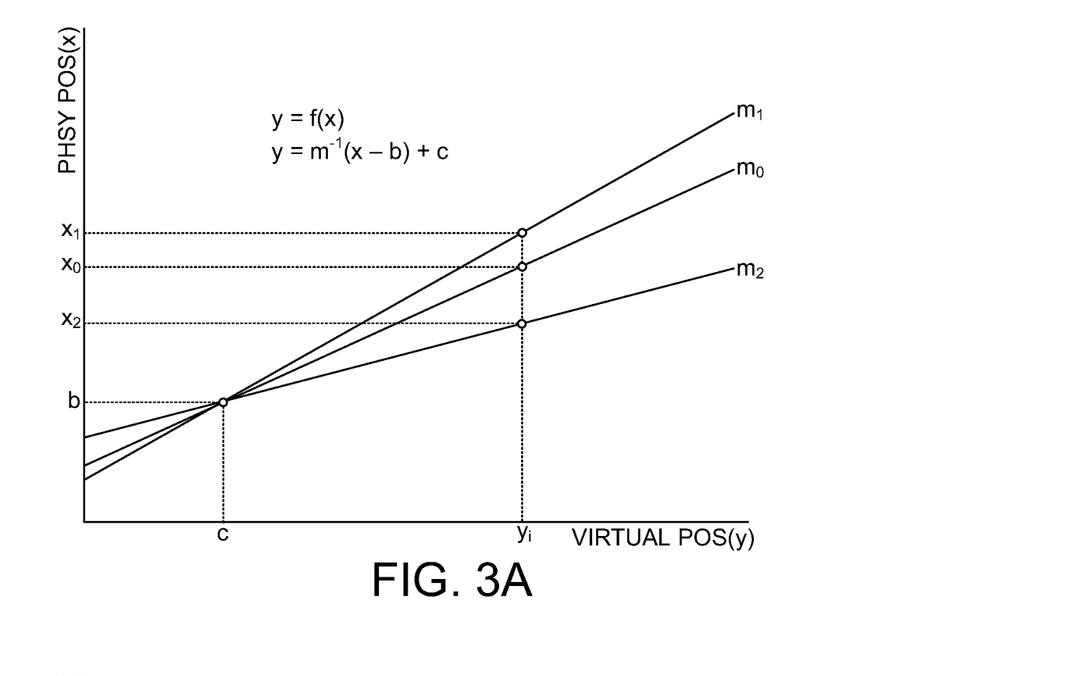
FIG. 3A shows an embodiment wherein the conversion from the physical position measurement of each disk surface is represented by a respective linear function that accounts for a difference between the actual radial density of servo tracks on each disk surface and a nominal radial density.

FIG. 3A illustrates a relationship between the physical position measurements (vertical axis) generated by reading the servo sectors of each disk surface relative to the corresponding virtual position measurement (horizontal axis) after the conversion, according to an embodiment. In this embodiment, the conversion between physical position measurement to virtual position measurement is represented by the following linear function:

$$y = m^{-1}(x-b) + c$$

where y represents the virtual position measurement, x represents the physical position measurement, m represents the slope of the line, and b and c are arbitrary offsets. In the example of FIG. 3A, the slope $m_0$ represents the nominal radial density of servo tracks, the slope $m_1$ represents the radial density of servo tracks on a first disk surface, and the slope $m_2$ represents the radial density of servo tracks on a second disk surface. In this example embodiment the radial density of servo tracks on the first disk surface is higher than the nominal radial density, and the radial density of servo tracks on the second disk surface is lower than the nominal radial density. Therefore when the first and second heads are at the same radial location represented by virtual position $y_i$, the physical position measurement $x_1$ for the first disk surface will be higher than the corresponding nominal physical position measurement $x_0$, and the physical position measurement $x_2$ for the second disk surface will be lower than the corresponding nominal physical position measurement $x_0$. However, when the physical position measurements are converted, for example, using a conversion function that compensates for the different radial densities, the resulting virtual position measurement $y_i$ for both the first and second heads will be the same.

In one embodiment illustrated in FIG. 3A, when the first and second heads are at a radial location represented by offset c, the physical position measurements for each disk surface will equal the nominal physical position measurement (i.e., at the intersection of the lines defined by the slopes $m_0$, $m_1$ and $m_2$). In one embodiment, this radial location may identify a boundary servo track, such as the first servo track (servo track zero). However, in another embodiment this radial location may represent any virtual position measurement and any corresponding servo track number. In one embodiment, at least one parameter used to convert the physical position measurements into the virtual position measurements may be stored on at least one disk surface at the radial location represented by offset c. In this manner, the servo control system may seek the heads to this radial location without needing to perform a conversion from physical to virtual since the physical and virtual position measurements are equal at this radial location. In other words, when the disk drive is initialized (e.g., at power on) the servo control system may seek the heads to the radial location represented by offset c and read the conversion parameters from at least one disk surface regardless as to the radial density of servo tracks on each disk surface. Once the conversion parameters have been successfully recovered, the servo control system may seek to any radial position (represented by the virtual position measurement) for any disk surface using the conversion operation.

In the embodiment of FIG. 3A, the conversion from physical to virtual position measurement is represented by a linear function. However, in other embodiments the conversion may be represented in any suitable manner, such as with a non-linear function (e.g., a polynomial function), or a piecewise linear function. For example, in one embodiment the radial density of data tracks may vary across each disk surface (e.g., decrease near the outer diameter) and therefore require a more sophisticated function to represent the relationship between the physical position measurements and corresponding virtual position measurement. In one embodiment, the conversion from physical to virtual position measurement may be implemented using a suitable lookup table generated based on a conversion function. In one embodiment, the lookup table may represent discrete data points of a conversion function where interpolation and/or extrapolation may be used to fill in missing data points as part of the conversion process during normal operation.

Figure 3B:
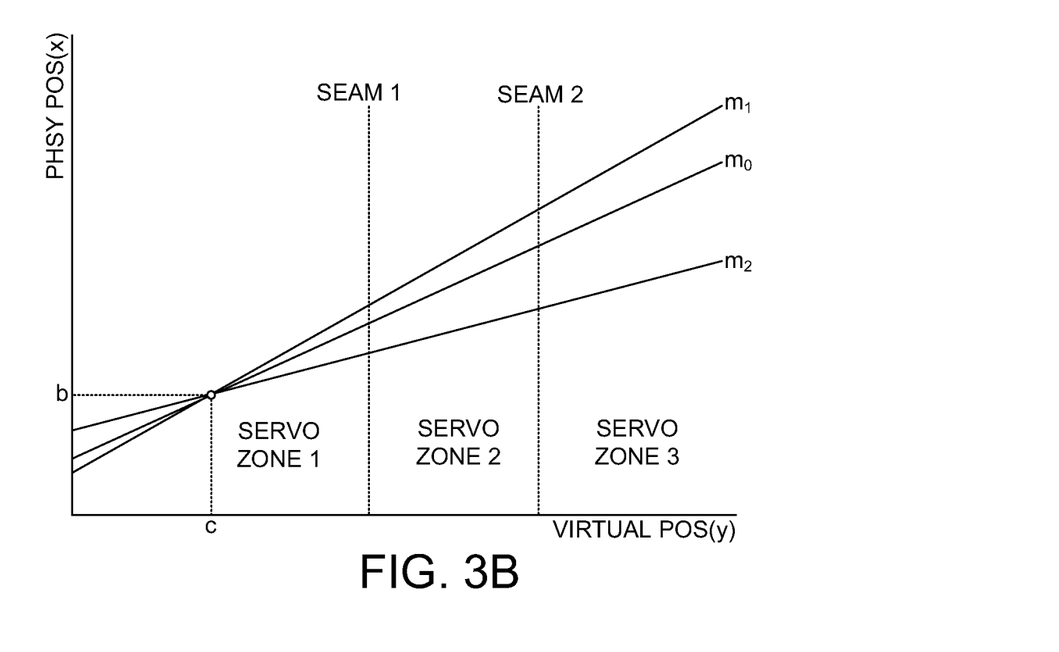
FIG. 3B shows an embodiment wherein servo zone boundaries are defined at a target virtual position (common radial location across the disk surfaces).
Figure 4:
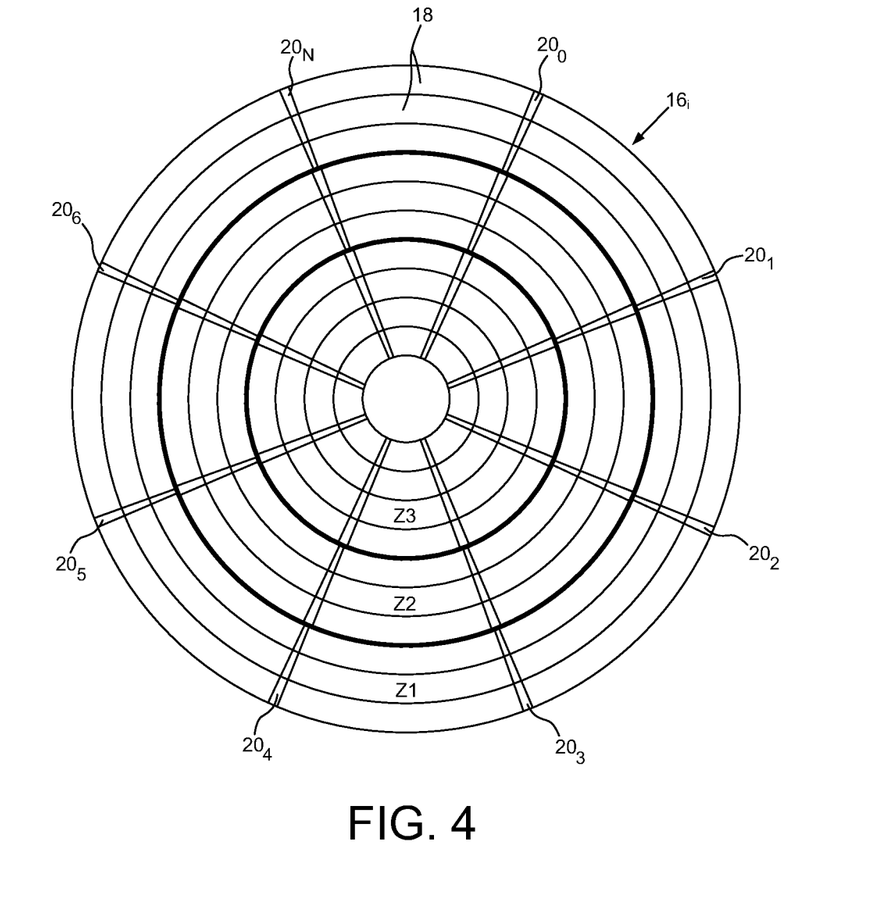
FIG. 4 shows an embodiment wherein the servo tracks on a disk surface are grouped to form servo zones, wherein a servo data rate varies across the servo zones.

In one embodiment, the servo tracks of the first and second disk surfaces are grouped to define servo zones, and a servo data rate of each servo zone varies across the servo zones. FIG. 4 illustrates an example of this embodiment wherein the servo tracks 18 of a disk surface $16_i$ are grouped to define three servo zones (Z1 to Z3), wherein the servo data rate of the servo sectors remains substantially constant within the servo zone, but changes across the servo zones (e.g., increases toward the outer diameter zones to achieve a more constant linear bit density). FIG. 3B illustrates an embodiment wherein the boundaries of the servo zones may align radially across the disk surfaces (e.g., across first and second disk surfaces) so that a servo zone transition occurs at known radial locations (virtual position measurements) when performing a head switch. In one embodiment, the offset c in FIG. 3B may represent the boundary of servo zone Z1 (e.g., servo track zero), and in other embodiments the boundary of servo zone Z1 may be defined at a different radial location and corresponding virtual position measurement.

In one embodiment, the radial locations that define the boundaries for the servo zones (e.g., SEAM 1 and SEAM 2) in FIG. 3B may be determined prior to recording the servo sectors onto each disk surface, and in one embodiment, may be the same radial location across a family of disk drives. Accordingly, in one embodiment the boundaries for the servo zones represented as virtual position measurements may be converted into corresponding physical position measurements for each disk surface so that when servo writing each disk surface, the servo data rate of the servo sectors may be adjusted based on the physical position measurement that corresponds to a servo zone boundary. The servo sectors may be servo written on each disk surface in any suitable manner, including the use of an external media writer prior to inserting each disk into a production disk drive. In another embodiment, the control circuitry 24 internal to each production disk drive may self-servo write the servo sectors, including to adjust the servo data rate when reaching the boundary of a servo zone.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

While the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a first disk surface comprising servo tracks defined by servo sectors and recorded at a first radial density;
a first head actuated over the first disk surface; and
control circuitry configured to:
read a servo sector on the first disk surface to generate a first physical position measurement;
first convert the first physical position measurement into a first virtual position measurement corresponding to a nominal radial density of servo tracks different from the first radial density; and
servo the first head over the first disk surface based on the first virtual position measurement.

2. The data storage device as recited in claim 1, further comprising:
a second disk surface comprising servo tracks defined by servo sectors and recorded at a second radial density different from the first radial density; and
a second head actuated over the second disk surface;
wherein the control circuitry is further configured to:
read a servo sector on the second disk surface to generate a second physical position measurement;
second convert the second physical position measurement into a second virtual position measurement corresponding to the nominal radial density, wherein the second radial density is different from the nominal radial density; and
servo the second head over the second disk surface based on the second virtual position measurement.

3. The data storage device as recited in claim 1, wherein the control circuitry is further configured to first convert the first physical position measurement into the first virtual position measurement based on a first conversion function.

4. The data storage device as recited in claim 2, wherein the control circuitry is further configured to second convert the second physical position measurement into the second virtual position measurement based on a second conversion function.

5. The data storage device as recited in claim 2, wherein when the first head and the second head are both positioned at a first radial location:
the first physical position measurement substantially equals the second physical position measurement; and
the first virtual position measurement substantially equals the second virtual position measurement.

6. The data storage device as recited in claim 5, wherein at the first radial location the first virtual position measurement and the second virtual position measurement identify a boundary servo track.

7. The data storage device as recited in claim 5, wherein the control circuitry is further operable to read at least one parameter for the first conversion and the second conversion from at least one of the first disk surface and the second disk surface at the first radial location.

8. The data storage device as recited in claim 5, wherein when the first head and the second head are both positioned at a second radial location:
the first physical position measurement does not equal the second physical position measurement; and
the first virtual position measurement substantially equals the second virtual position measurement.

9. The data storage device as recited in claim 8, wherein:
the servo tracks of the first and second disk surfaces are grouped to define servo zones;
a servo data rate of each servo zone varies across the servo zones; and
the second radial location defines a servo zone boundary between servo zones on both the first and second disk surface.

10. The data storage device as recited in claim 9, wherein the control circuitry is further configured to servo write the servo sectors on the first disk surface and the second disk surface such that the second radial location defines the servo zone boundary.

11. The data storage device as recited in claim 1, wherein:
when the first head is positioned at a first radial location the first physical position measurement substantially equals the first virtual position measurement; and
when the first head is positioned at a second radial location the first physical position measurement does not equal the first virtual position measurement.

12. The data storage device as recited in claim 11, wherein at the first radial location the first virtual position measurement identifies a boundary servo track.

13. The data storage device as recited in claim 11, wherein the control circuitry is further operable to read at least one parameter for the first conversion from the first disk surface at the first radial location.

14. A method of operating a data storage device, the method comprising:
    reading a servo sector on a first disk surface to generate a first physical position measurement;
    first converting the first physical position measurement into a first virtual position measurement corresponding to a nominal radial density of servo tracks different from a first radial density of servo tracks on the first disk surface; and
    servoing a first head over a first disk surface based on the first virtual position measurement.

15. The method as recited in claim 14, further comprising:
    reading a servo sector on a second disk surface to generate a second physical position measurement;
    second converting the second physical position measurement into a second virtual position measurement corresponding to the nominal radial density of servo tracks, wherein a second radial density of servo tracks recorded on the second disk surface is different from the first radial density; and
    servo a second head over a second disk surface based on the second virtual position measurement.

16. The method as recited in claim 14, further comprising first converting the first physical position measurement into the first virtual position measurement based on a first conversion function.

17. The method as recited in claim 15, further comprising second converting the second physical position measurement into the second virtual position measurement based on a second conversion function.

18. The method as recited in claim 15, wherein when the first head and the second head are both positioned at a first radial location:
    the first physical position measurement substantially equals the second physical position measurement; and
    the first virtual position measurement substantially equals the second virtual position measurement.

19. The method as recited in claim 18, wherein at the first radial location the first virtual position measurement and the second virtual position measurement identify a boundary servo track.

20. The method as recited in claim 18, further comprising reading at least one parameter for the first conversion and the second conversion from at least one of the first disk surface and the second disk surface at the first radial location.

21. The method as recited in claim 18, wherein when the first head and the second head are both positioned at a second radial location:
    the first physical position measurement does not equal the second physical position measurement; and
    the first virtual position measurement substantially equals the second virtual position measurement.

22. The method as recited in claim 18, wherein:
    the servo tracks of the first and second disk surfaces are grouped to define servo zones;
    a servo data rate of each servo zone varies across the servo zones; and
    the second radial location defines a servo zone boundary between servo zones on both the first and second disk surface.

23. The method as recited in claim 22, further comprising servo writing the servo tracks on the first disk surface and the second disk surface such that the second radial location defines the servo zone boundary.

24. The method as recited in claim 14, wherein:
    when the first head is positioned at a first radial location the first physical position measurement substantially equals the first virtual position measurement; and
    when the first head is positioned at a second radial location the first physical position measurement does not equal the first virtual position measurement.

25. The method as recited in claim 24, wherein at the first radial location the first virtual position measurement identifies a boundary servo track.

26. The method as recited in claim 24, further comprising reading at least one parameter for the first conversion from the first disk surface at the first radial location.

* * * * *